US012598436B2

(12) United States Patent
Lian

(10) Patent No.: US 12,598,436 B2
(45) Date of Patent: Apr. 7, 2026

(54) AUDIO SIGNAL COMPENSATION METHOD AND APPARATUS, EARPHONE AND STORAGE MEDIUM

(71) Applicant: GUANGDONG OPPO MOBILE TELECOMMUNICATIONS CORP., LTD., Dongguan (CN)

(72) Inventor: Tianfu Lian, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 271 days.

(21) Appl. No.: 18/379,726

(22) Filed: Oct. 13, 2023

(65) Prior Publication Data

US 2024/0040325 A1 Feb. 1, 2024

Related U.S. Application Data

(63) Continuation of application No. PCT/CN2022/081518, filed on Mar. 17, 2022.

(30) Foreign Application Priority Data

Apr. 14, 2021 (CN) ......................... 202110400452.9
Aug. 13, 2021 (CN) ......................... 202110928243.1

(51) Int. Cl.
*H04R 1/10* (2026.01)
*H04R 3/04* (2006.01)
*H04R 29/00* (2006.01)

(52) U.S. Cl.
CPC ......... *H04R 29/001* (2013.01); *H04R 1/1016* (2013.01); *H04R 3/04* (2013.01);
(Continued)

(58) Field of Classification Search
CPC ...... H04R 29/001; H04R 25/305; H04R 3/04; H04R 2430/01; H04R 25/70; G10K 11/17881
See application file for complete search history.

(56) References Cited

U.S. PATENT DOCUMENTS 4,615,007 A 9/1986 King et al.
6,396,930 B1 * 5/2002 Vaudrey ................ A61B 5/121 381/60
(Continued)

FOREIGN PATENT DOCUMENTS

CA 2283650 A1 * 9/1998 ........... H04R 29/001
CN 1798452 A 7/2006
(Continued)

OTHER PUBLICATIONS

First Office Action for Chinese Application No. 202110928243.1 mailed on Oct. 25, 2024 (25 pages).
(Continued)

*Primary Examiner* — James K Mooney
(74) *Attorney, Agent, or Firm* — Sheppard, Mullin, Richter & Hampton LLP

(57) ABSTRACT

The embodiments of the present disclosure relate to audio processing technology, and discloses an audio signal compensation method and apparatus, an earphone and a storage medium. The method is applied in an earphone including a speaker. The method includes: performing system frequency response correction on an initial audio signal to obtain a corrected audio signal; outputting the corrected audio signal via the speaker; obtaining hearing test information fed back for the corrected audio signal; and determining a compensation parameter according to the hearing test information, the compensation parameter being used to compensate a target audio signal to be outputted. By implementing the embodiments of the present disclosure, a user's actual
(Continued)

hearing test information can be obtained more accurately, thereby improving flexibility and accuracy of audio signal compensation based on hearing test results.

18 Claims, 5 Drawing Sheets

(52) U.S. Cl.
CPC ...... *H04R 2430/01* (2013.01); *H04R 2460/01* (2013.01); *H04R 2460/11* (2013.01)

(56) References Cited

U.S. PATENT DOCUMENTS

| | | | | |
|---|---|---|---|---|
| 2012/0039495 | A1 | 2/2012 | Ono | |
| 2014/0086434 | A1 | 3/2014 | Bang et al. | |
| 2015/0016621 | A1* | 1/2015 | Wiggins | H04R 25/70 381/60 |
| 2015/0358745 | A1 | 12/2015 | Rix et al. | |
| 2018/0098720 | A1* | 4/2018 | Raz | H04R 1/1091 |
| 2018/0332391 | A1 | 11/2018 | Zhao et al. | |
| 2019/0320268 | A1 | 10/2019 | Blau et al. | |
| 2020/0345278 | A1* | 11/2020 | Mortensen | A61B 5/125 |
| 2023/0111715 | A1* | 4/2023 | Li | H04R 25/356 381/60 |

FOREIGN PATENT DOCUMENTS

| | | | |
|---|---|---|---|
| CN | 103987000 | A | 8/2014 |
| CN | 105843581 | A | 8/2016 |
| CN | 110213707 | A | 9/2019 |
| CN | 110493695 | A | 11/2019 |
| CN | 110753295 | A | 2/2020 |
| CN | 111355841 | A | 6/2020 |
| CN | 111800696 | A | 10/2020 |
| JP | H06175817 | A | 6/1994 |
| WO | 9841973 | A1 | 9/1998 |
| WO | 2020127939 | A1 | 6/2020 |
| WO | 2021015315 | A1 | 1/2021 |

OTHER PUBLICATIONS

Chinese Second Office Action, Chinese Application No. 202110928243.1, mailed Apr. 9, 2025 (24 pages).

International Search Report and Written Opinion dated Jun. 13, 2022 in International Application No. PCT/CN2022/081518. English translation attached.

Zhang,Zhiwen"Non-official translation:Microcomputer Detection Technology of Hearing Curve" Electronic Technology No. 05, May 12, 2000(May 12, 2000), entire document.

Chinese Rejection decision,Chinese Application No. 202110928243.1, mailed Jul. 4, 2025 (24 pages).

* cited by examiner

AUDIO SIGNAL COMPENSATION METHOD AND APPARATUS, EARPHONE AND STORAGE MEDIUM

CROSS-REFERENCE TO RELATED APPLICATIONS

The present disclosure is a continuation of International Application No. PCT/CN2022/081518 filed on Mar. 17, 2022, which claims priority to Chinese Patent Application No. 202110400452.9, titled "AUDIO SIGNAL COMPENSATION METHOD AND APPARATUS, EARPHONE AND STORAGE MEDIUM" and filed on Apr. 14, 2021, and Chinese Patent Application No. 202110928243.1, titled "AUDIO SIGNAL COMPENSATION METHOD AND APPARATUS, EARPHONE AND STORAGE MEDIUM" and filed on Aug. 13, 2021, which are incorporated herein by reference in their entireties.

TECHNICAL FIELD

The present disclosure relates to audio processing technology, and more particularly, to an audio signal compensation method and apparatus, an earphone and a storage medium.

BACKGROUND

At present, different users often have different sensitivities to audio signals due to differences in their own hearing characteristics (such as different degrees of hearing impairment, different style preferences, etc.). Thus, in order to ensure that users can hear audio signals, it is necessary to compensate audio signals outputted to the users accordingly. However, in practice, it is found that traditional audio signal compensation solutions are often difficult to obtain accurate hearing test results for users, resulting in difficulties to perform effective audio signal compensation accordingly and in turn reduced flexibility and accuracy of audio signal compensation based on hearing test results.

SUMMARY

The embodiments of the present disclosure disclose an audio signal compensation method, an earphone, and a storage medium.

In a first aspect, an embodiment of the present disclosure discloses an audio signal compensation method. The method is applied in an earphone having a speaker, and the method includes: performing system frequency response correction on an initial audio signal to obtain a corrected audio signal; outputting the corrected audio signal via the speaker; obtaining hearing test information fed back for the corrected audio signal; and determining a compensation parameter according to the hearing test information, the compensation parameter being used to compensate a target audio signal to be outputted.

In a second aspect, an embodiment of the present disclosure discloses an earphone. The earphone includes a speaker, a memory and a processor, the memory has a computer program stored thereon, and the computer program, when executed by the processor, causes the processor to implement: performing system frequency response correction on an initial audio signal to obtain a corrected audio signal; outputting the corrected audio signal via the speaker; obtaining hearing test information fed back for the corrected audio signal; and determining a compensation parameter according to the hearing test information, the compensation parameter being used to compensate a target audio signal to be outputted.

In a third aspect, an embodiment of the present disclosure discloses a computer-readable storage medium. The computer-readable storage medium has a computer program stored thereon. The computer program, when executed by a processor, implements: performing system frequency response correction on an initial audio signal to obtain a corrected audio signal; outputting the corrected audio signal via a speaker; obtaining hearing test information fed back for the corrected audio signal; and determining a compensation parameter according to the hearing test information, the compensation parameter being used to compensate a target audio signal to be outputted.

BRIEF DESCRIPTION OF DRAWINGS

In order to more clearly illustrate the technical solutions in the embodiments of the present disclosure, the accompanying drawings that need to be used in the embodiments will be briefly introduced below. Obviously, the accompanying drawings in the following description are only some embodiments of the present disclosure. Those of ordinary skill in the art can also obtain other drawings based on these drawings without any inventive efforts.

DESCRIPTION OF EMBODIMENTS

The technical solutions in the embodiments of the present disclosure will be clearly and completely described below in conjunction with the drawings in the embodiments of the present disclosure. Obviously, the described embodiments are only some, rather than all, of the embodiments of the present disclosure. Based on the embodiments in the present disclosure, all other embodiments obtained by those of ordinary skill in the art without any inventive efforts belong to the scope of protection of the present disclosure.

It should be noted that the terms "comprising" and "having" and any variants thereof in the embodiments of the present disclosure are intended to cover non-exclusive inclusion. For example, a process, method, system, product, or device that includes a series of operations or units is not necessarily limited to those operations or units explicitly listed, but may include other operations or units not explicitly listed or inherent to the process, method, product or device.

The embodiments of the present disclosure disclose an audio signal compensation method and apparatus, an earphone, and a storage medium, which can more accurately obtain a user's actual hearing test information, thereby improving the flexibility and accuracy of audio signal compensation based on hearing test results.

A detailed description will be given below in conjunction with the accompanying drawings.

Figure 1A:
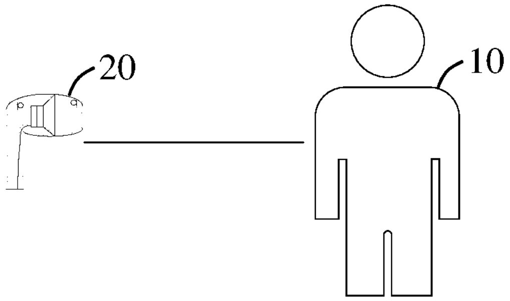
FIG. 1A is a schematic diagram showing an application scenario of the audio signal compensation method disclosed in an embodiment of the present disclosure.
Figure 1B:
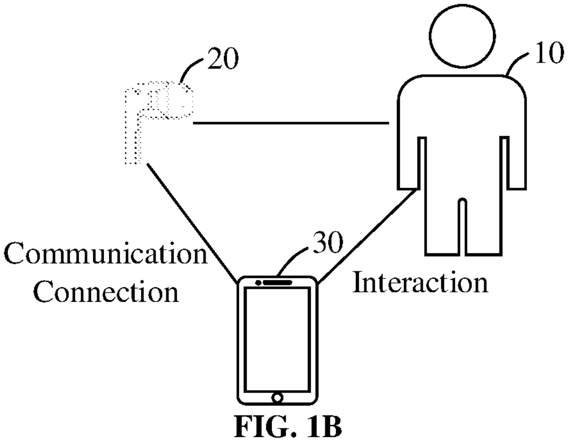
FIG. 1B is a schematic diagram showing another application scenario of the audio signal compensation method disclosed in an embodiment of the present disclosure.

Referring to FIG. 1A and FIG. 1B together, FIG. 1A is a schematic diagram showing an application scenario of an audio signal compensation method disclosed in an embodiment of the present disclosure, and FIG. 1B is a schematic diagram showing another application scenario of an audio signal compensation method disclosed in an embodiment of the present disclosure. As shown in FIG. 1A, the present disclosure scenario may include a user 10 and an earphone 20, and the user 10 may autonomously perform a hearing test using the earphone 20, such that the earphone 20 can obtain hearing test information corresponding to the user 10, and can then perform corresponding audio signal compensation according to the hearing test information. That is, the earphone 20 can compensate a target audio signal to be outputted to different degrees according to hearing characteristics of the user 10 (such as different degrees of hearing impairment, different style preferences, etc.), and output the compensated target audio signal, so as to ensure that the user 10 can hear the target audio signal.

Exemplarily, when it is desired to perform hearing test of the user 10 to perform corresponding audio signal compensation, the user may interact with the earphone 20 and issue a hearing test instruction to the earphone 20 to trigger the earphone 20 to start hearing test. Specifically, the hearing test can be performed using one or more detection audio signals. That is, the earphone 20 can evaluate the hearing characteristics of the user 10 by outputting the detection audio signals and detecting feedbacks from the user 10 on the detection audio signals.

In an embodiment of the present disclosure, the earphone 20 may perform system frequency response correction on an initial audio signal to obtain a corrected audio signal, and output the corrected audio signal via a speaker (not shown) of the earphone 20. Here, the system frequency response correction can eliminate as much ambient impact on the audio signal during the transmission process as possible, such that after the corrected audio signal actually outputted by the speaker is transmitted and heard by the user 10, the audio signal heard by the user 10 can be as close to the initial audio signal as possible, thereby improving the fidelity of the audio signal and achieving environment-adaptive system frequency response correction. On this basis, the earphone 20 can obtain the hearing test information fed back by the user 10 for the corrected audio signal, and then can determine a compensation parameter according to the hearing test information, such that the compensation parameter can be used for compensation of the target audio signal to be outputted by the speaker.

In some embodiments, as shown in FIG. 1B, the earphone 20 can also be connected to a terminal device 30, such that when it is desired to perform a hearing test of the user 10, the user can interact with the terminal device 30, so as to transmit a hearing test instruction to the earphone 20 via the terminal device 30, and trigger the earphone 20 to start hearing test. Exemplarily, the terminal device 30 may include various devices or systems with wireless communication functions, such as mobile phone, smart wearable device, vehicle-mounted terminal, tablet computer, Personal Computer (PC), Personal Digital Assistant (PDA), etc., and the embodiment of the present disclosure is not limited to any of these examples. It should be noted that when the earphone 20 obtains the hearing test information fed back by the user 10 for the corrected audio signal, it may obtain the hearing test information fed back directly by the user 10 via the earphone 20; or the terminal device 30 may obtain the hearing test information fed back from the user 10, and then the earphone 20 can communicate with the terminal device 30 to obtain the hearing test information transmitted by the terminal device 30.

In the related art, in order to perform hearing test of the user, the degree of hearing impairment of the user (such as the degree of damage to the outer hair cells of the ear, the degree of damage to the inner hair cells of the ear, etc.) can be detected by a professional detection physician in special environments such as a silent room or anechoic room, and then a corresponding compensation model can be designed according to a difference in audio signal perception between normal hearing and impaired hearing, to calculate a gain compensation that should be provided at each frequency point. It can be seen that the related art has extremely high requirements on the hearing test environment, and it is also relatively difficult to implement. In order to solve the above problems, the audio signal compensation method disclosed in the embodiment of the present disclosure can enable a user to conveniently detect his/her own hearing characteristics using an earphone, and determine an appropriate detection audio signal using environment-adaptive system frequency response correction, and eliminate as much ambient impact during audio signal transmission as possible, such that relatively accurate hearing test can be achieved without special environments such as silent rooms or anechoic rooms. After calculating the corresponding compensation parameters according to the hearing test results, the earphone can perform corresponding audio signal compensation on the target audio signal to be outputted to the user, so as to ensure that the user can hear the target audio signal, such that the actual hearing test information of the user can be obtained more accurately, thereby further improving the flexibility and accuracy of audio signal compensation based on the hearing test results.

Figure 2:
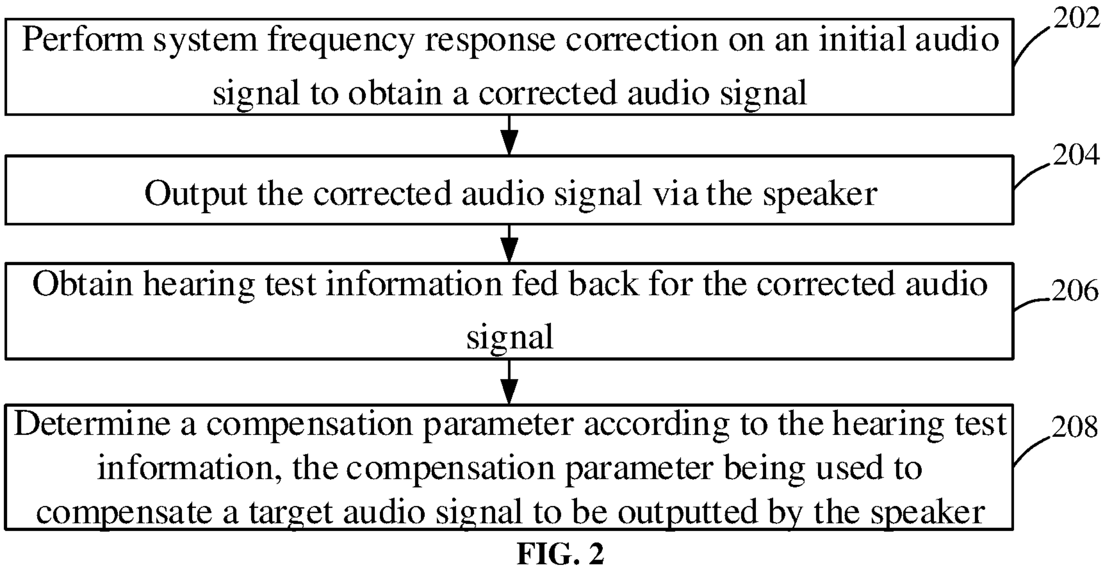
FIG. 2 is a schematic flowchart illustrating an audio signal compensation method disclosed in an embodiment of the present disclosure.

Reference is made to FIG. 2, which is a schematic flowchart illustrating an audio signal compensation method disclosed in an embodiment of the present disclosure. The method may be applied to the above earphone, and the earphone may include a speaker. As shown in FIG. 2, the audio signal compensation method may include the following operations.

Operation 202, system frequency response correction is performed on an initial audio signal to obtain a corrected audio signal.

In an embodiment of the present disclosure, in order to perform corresponding audio signal compensation according to the user's hearing characteristics (such as different degrees of hearing impairment, different style preferences, etc.), it is necessary to first obtain the hearing test information corresponding to the user. Therefore, the earphone can evaluate the hearing characteristics of the user by outputting a certain audio signal and detecting the user's feedback on the audio signal, and obtain corresponding hearing test information.

Specifically, the earphone can first determine the initial audio signal, and the initial audio signal can include a pure tone signal at a certain frequency point (such as 500 Hz, 1000 Hz, etc.). That is, it is only composed of the audio signal component corresponding to the frequency point, and does not contain any audio signal with audio signal components at other frequencies. By using the pure tone signal as the initial audio signal, the user's hearing sensitivity at the frequency point can be accurately determined with the subsequent hearing test process, so as to determine the corresponding hearing test information.

On this basis, by performing system frequency response correction on the initial audio signal, the earphone can obtain a corrected audio signal corresponding to the initial audio signal. Here, the system frequency response correction can eliminate as much impact on the audio signal during its transmission in the audio system as possible, such that after the corrected audio signal actually outputted by the earphone is transmitted and heard by the user, the audio signal heard by the user can be as close to the initial audio signal as possible. It should be noted that the above audio system refers to a channel through which the audio signal outputted by the earphone is transmitted between the earphone and the user. In some embodiments, the earphone may include a speaker and a feedback microphone. When the user wears the earphone, the feedback microphone is between the speaker and the user, such that the above audio system can be approximated by a channel through which an audio signal is transmitted between the speaker and the feedback microphone. By performing the above system frequency response correction, the fidelity of audio signal transmission by the audio system can be improved, and the corrected audio signal after subsequent transmission can be restored as close to the initial audio signal as possible, thereby improving the accuracy and reliability of hearing test.

Operation 204, the corrected audio signal is outputted via the speaker.

Specifically, after the earphone obtains the corrected audio signal, it can convert the corrected audio signal in the form of an electrical signal into a corresponding sound wave vibration using the speaker, so as to output the corrected audio signal to the user, thereby obtaining a feedback regarding whether the user can hear the corrected audio signal in a subsequent operation, and then obtaining hearing test information fed back by the user for the corrected audio signal.

Operation 206, hearing test information fed back for the corrected audio signal is obtained.

In an embodiment of the present disclosure, when the earphone obtains the hearing test information fed back for the corrected audio signal, it needs to be done by interaction with the user. That is, based on the feedback regarding whether the user can hear the corrected audio signal, the hearing test result corresponding to the corrected audio signal is determined. Here, the hearing test information may include subjective judgment information on whether the user can hear the corrected audio signal, and may also include a critical sound intensity that is further determined according to the subjective judgment information (that is, the sound intensity of the corrected audio signal when the user can just hear the corrected audio signal), the audible sound intensity range, etc.

In an embodiment, when the user obtains the above hearing test information as fed back only via the earphone, it may be done by detecting the user's operation on the earphone. Exemplarily, the user's operation on the earphone may include a touch operation, a voice operation, a movement operation, and the like.

For example, when the user hears the corrected audio signal, he/she can touch a designated touch point on the earphone, such that when the earphone detects the touch operation on the designated touch point, it can determine the hearing state that the user has heard the corrected audio signal, and then obtain the corresponding hearing test information.

In another example, when the user hears the corrected audio signal, he/she can directly issue a voice command "heard", and when the user does not hear the corrected audio signal, he/she can directly issue a voice command "not heard", such that the earphone can parse the voice command it detects to determine if the user hears the corrected audio signal.

In another example, the user can also move, turn or shake his/her head in different directions according to whether the corrected audio signal is heard or not, such that the earphone can detect its own movement state using a sensor to determine a hearing state regarding whether the corresponding user hears the corrected audio signal. Specifically, for example, when the user hears the corrected audio signal, he/she can tilt his/her head to the left so that the earphone can detect the trend of moving to the left. When the user does not hear the corrected audio signal, he/she can tilt his/her head to the right so that the earphone can detect the trend of moving to the right. Then the earphone can determine the hearing test information fed back by the user for the corrected audio signal according to the detected movement trend. In another example, when the user hears the corrected audio signal, he/she can turn his/her head horizontally to the left (or horizontally to the right), and when the user does not hear the corrected audio signal, he/she can turn his/her head horizontally to the right (or horizontally to the left), such that the earphone can determine the hearing test information fed back by the user for the corrected audio signal according to the movement trajectory detected by the earphone. In another example, when the user hears the corrected audio signal, he/she can move his/her head down and up (that is, nodding); when the user does not hear the corrected audio signal, he/she can move his/her head left and right (that is, shaking), such that the earphone can determine the hearing test information fed back by the user for the corrected audio signal according to the detected movement direction or frequency it detects.

In another embodiment, when the user obtains the hearing test information as fed back above via a terminal device communicatively connected with the earphone, it may also be done by obtaining the user's operation on the terminal device. Exemplarily, the user's operation on the terminal device may include a touch operation, a button click operation, and the like. When the terminal device detects the above user operation, it may determine the hearing state regarding whether the user hears the corrected audio signal according to the user operation, and transmit the hearing state to the earphone. On this basis, the earphone can further obtain the hearing test information fed back for the corrected audio signal according to the hearing state it receives.

Operation 208, a compensation parameter is determined according to the hearing test information, the compensation parameter being used to compensate a target audio signal to be outputted by the speaker.

Specifically, the earphone can invoke the hearing test information using its built-in processor, and analyze the user's hearing characteristics (such as different degrees of hearing impairment, different style preferences, etc.) based on the hearing test information, so as to determine the user's degrees of hearing sensitivity to different frequency components of audio signals. For example, if it is determined according to the hearing test information that the user's hearing sensitivity at a certain frequency point is low, i.e., it is difficult for the user to hear the audio signal at the frequency component, then the frequency component of the audio signal can be enhanced subsequently. If it is determined according to the hearing test information that the user's hearing sensitivity at a certain frequency point is too high, i.e., the user may easily be stimulated by the audio signal at the frequency component, and then the frequency component of the audio signal can be retained or weakened subsequently.

According to the hearing characteristics of the user obtained from the above analysis, the earphone can further calculate the corresponding compensation parameter, which can be used to compensate the target audio signal to be outputted by above speaker. That is, for different frequency components of the target audio signal, compensation corresponding to the hearing characteristics of the user can be performed respectively. Exemplarily, the above compensation parameter may include a filter parameter (such as tap coefficients used to configure a filter, etc.), such that according to the hearing characteristics of the user, respective filters can be configured for frequency components that need to be compensated in the target audio signal to be outputted, so as to perform compensation filtering. For example, when it is necessary to compensate an audio signal in a specific frequency band, compensation filtering can be done by configuring a band-pass filter or a band-stop filter for the corresponding frequency band. When it is necessary to perform more complex compensation for audio signals in multiple frequency bands, the corresponding compensation filtering can be performed by configuring cascaded Finite Impulse Response (FIR) filters or Infinite Impulse Response (IIR) filters.

It can be seen that the audio signal compensation method disclosed in the embodiment of the present disclosure can enable a user to conveniently detect his/her own hearing characteristics using an earphone, and determine an appropriate detection audio signal using environment-adaptive system frequency response correction, and eliminate as much ambient impact during audio signal transmission as possible, such that relatively accurate hearing test can be achieved without special environments such as silent rooms or anechoic rooms. The actual hearing test information of the user can be obtained more accurately. Further, by compensating the corresponding audio signal, it is possible to ensure that the user can hear the target audio signal outputted from the speaker, thereby further improving the flexibility and accuracy of audio signal compensation based on the hearing test results.

Figure 3:
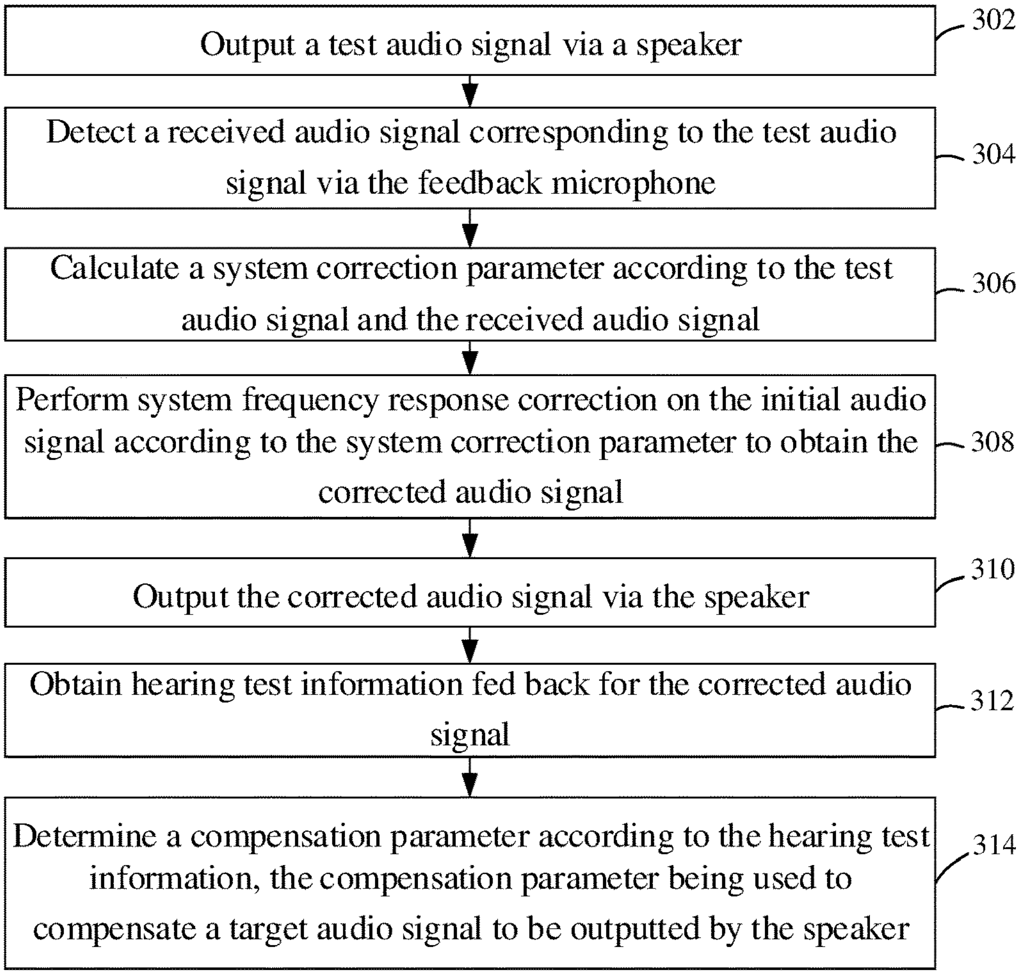
FIG. 3 is a schematic flowchart illustrating another audio signal compensation method disclosed in an embodiment of the present disclosure.

Reference is made to FIG. 3, which is a schematic flowchart illustrating another audio signal compensation method disclosed in an embodiment of the present disclosure. The method may be applied in the earphone, and the earphone may include a speaker and a feedback microphone. As shown in FIG. 3, the audio signal compensation method may include the following operations.

Operation 302, a test audio signal is outputted via a speaker.

In an embodiment of the present disclosure, when it is necessary to perform a hearing test of the user, before the earphone outputs an actual detection audio signal, the earphone may first output a test audio signal via its speaker. Here, the test audio signal may include a short segment of audio signal for transmission in the audio system where the earphone is located (that is, the path through which the audio signal outputted by the earphone is transmitted between the earphone and the user), and is received by the feedback microphone to calculate the corresponding system frequency response of the audio system. It can be understood that since the feedback microphone is located between the speaker and the user, the above audio system can also be approximated by a path through which the audio signal is transmitted between the speaker and the feedback microphone. By calculating the system frequency response of the audio system, the ambient impact of the audio signal during the transmission of the audio system can be determined, and then the system frequency response can be corrected in a subsequent operation to achieve system frequency response correction for the initial audio signal.

In some embodiments, when the earphone outputs the test audio signal via its speaker, the impact of the ambient sound in the environment where the earphone is located can also be considered. If the sound intensity of the ambient sound is relatively high, the sound intensity of the outputted test audio signal should also be increased to improve the signal-to-noise ratio of the audio signal and prevent the ambient sound from interfering with the system frequency response correction.

Figure 4:
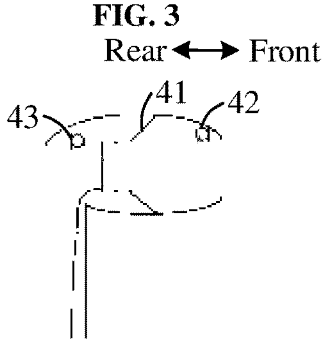
FIG. 4 is a schematic diagram showing a structure of an earphone disclosed in an embodiment of the present disclosure.

Specifically, in order to evaluate the impact of the ambient sound, as shown in FIG. 4, the earphone may include a feed-forward microphone 43, in addition to the speaker 41 and the feedback microphone 42 arranged in front of the speaker 41, and the feed-forward microphone 43 may be arranged behind the speaker 41 (that is, when the user wears the earphone, the feed-forward microphone is between the speaker and the external environment), so as to detect external ambient sound via the feed-forward microphone 43. Exemplarily, the earphone may detect ambient sound via the feed-forward microphone, and then determine the test sound intensity of the test audio signal outputted by the speaker according to the ambient sound intensity of the ambient sound. In this way, when the test audio signal is outputted via the speaker, a test audio signal with the test sound intensity can be outputted via the speaker.

Specifically, for example, the test audio signal may include a white noise signal, and the test sound intensity of the white noise signal may be positively correlated with the sound intensity of the ambient sound detected by the feed-forward microphone. For example, after the earphone detects the ambient sound via the feed-forward microphone, it can calculate the test sound intensity corresponding to the white noise signal according to the ambient sound intensity of the ambient sound and a specified positive correlation function, and then can use the white noise signal with the test sound intensity as the test audio signal for outputting via the speaker.

At 304, a received audio signal corresponding to the test audio signal is detected via the feedback microphone.

In an embodiment of the present disclosure, after the earphone outputs the test audio signal via the speaker, the received audio signal corresponding to the test audio signal as detected by its built-in feedback microphone can be obtained immediately. It can be understood that the feedback microphone of the earphone can continuously detect audio signals, such that according to a timestamp of the above test audio signal outputted by the speaker, the received audio signal detected by the feedback microphone at time close to the timestamp (such as 0.01 milliseconds later, 0.1 milliseconds later, etc.) can be obtained. In some embodiments, the feedback microphone of the earphone may not be continuously on, but may be triggered to be turned on by the speaker after the speaker outputs the above test audio signal, and the audio signal detected after the feedback microphone is turned on is used as the received audio signal corresponding to the above test audio signal. In some embodiments, for the received audio signal detected by the feedback microphone, the earphone can also use its built-in processor to compare the waveform of the test audio signal outputted by the speaker with the waveform of the received audio signal. When the comparison result shows that the waveform similarity between the test audio signal and the received audio signal satisfies a similarity threshold (such as 50%, 80%, etc.), the received audio signal may be confirmed as the received audio signal corresponding to the above test audio signal.

At 306, a system correction parameter is calculated according to the test audio signal and the received audio signal.

In an embodiment of the present disclosure, the earphone can first calculate the system frequency response of the audio system where the earphone is located based on the above test audio signal and the received audio signal, so as to determine the ambient impact experienced by the audio signal during the transmission of the audio system. On this basis, the earphone may further calculate a system correction parameter corresponding to the system frequency response based on the system frequency response. Here, the system correction parameter may include a filter parameter (such as tap coefficients used to configure a filter, etc.), an equalizer parameter (such as tap coefficients and gain coefficients used to configure a filter included in an equalizer, etc.), and the like, for correcting the system frequency response of the above audio system, so as to eliminate as much ambient impact on the audio signal during the transmission in the audio system as possible.

Exemplarily, when the earphone calculates the system correction parameter according to the test audio signal and the received audio signal, it may perform Fourier transform on each of the test audio signal and the received audio signal, and then compare the Fourier-transformed received audio signal with the Fourier-transformed test audio signal to obtain the system frequency response. Specifically, the built-in processor of the earphone can first perform frame division and windowing on the test audio signal and the received audio signal, that is, to divide the generally unstable audio signal into a plurality of audio signal frames with short-term stability (e.g., audio signal frames having frame lengths of 10-30 milliseconds), and then perform windowing and truncation on the above audio signal frame according to a specified window function to obtain each frame of test audio signal and received audio signal. Exemplarily, the windowing and truncation can be done by a windowing function shown in Equation 1:

$$w(n)=1, 0\le n\le N-1;$$

$$w(n)=0, \text{else} \qquad \text{Equation 1:}$$

where the piecewise function w(n) is a windowing function, and N is a unit window length. The effect of windowing and truncation can be provided by performing time-domain convolution on the test audio signal or the received audio signal with the windowing function.

On this basis, short-time Fourier transform can be performed by using Fast Fourier Transform (FFT) and other algorithms for a certain frame of test audio signal or received audio signal obtained after frame division and windowing, according to Equation 2:

$$X_n(e^{j\omega}) = \sum_{m=-\infty}^{+\infty} x(m)w(n-m)e^{-j\omega m}; \qquad \text{Equation 2}$$

where n is discrete time, the continuous frequency $\omega=2\pi k/N$, $k=0,1, \ldots, N-1$, N is the Fourier transform length, and x(m) is the m-th frame of audio signal. On this basis, the system frequency response can be obtained by comparing the Fourier-transformed received audio signal with the Fourier-transformed test audio signal, that is, the system frequency response H(k) can be obtained from the ratio Y(k)/X (k) of the frequency domain received audio signal Y(k) to the frequency domain test audio signal X(k).

Further, the earphone can also calculate a target equalizer parameter according to the system frequency response based on a Least Square criterion. Here, the target equalizer parameter can include tap coefficients, gain coefficients, etc. for configuring filters included in the target equalizer. With the target equalizer configured based on the target equalizer parameter, the initial audio signal can be equalized and corrected in a subsequent operation to obtain the corrected audio signal. In some embodiments, the target equalizer may include an equalizer composed of FIR filters, such that a regularized filter, an ideal band-pass filter, etc. may be used, and the target equalizer can be designed based on the above Least Square criterion and the goal of minimizing the equalization error using the regularized filter. Exemplarily, the expression of the response M(k) of the target equalizer in the frequency domain can be shown in the following Equation 3:

$$M(k) = * \frac{D^*(k)H(k)}{H(k)H^*(k) + \beta \cdot B(k)B^*(k)}; \qquad \text{Equation 3}$$

where H(k) is the above system frequency response, D(k) can represent the Fourier transform of the ideal band-pass filter response, B(k) can represent the Fourier transform of the regularized filter response, and β can represent the weighted scalar of the regularized filter. By configuring the above FIR equalizer, the amplitude equalization aiming at a flat amplitude frequency response and the phase equalization aiming at a linear phase can be achieved.

At 308, system frequency response correction is performed on the initial audio signal according to the system correction parameter to obtain the corrected audio signal.

Figure 5:
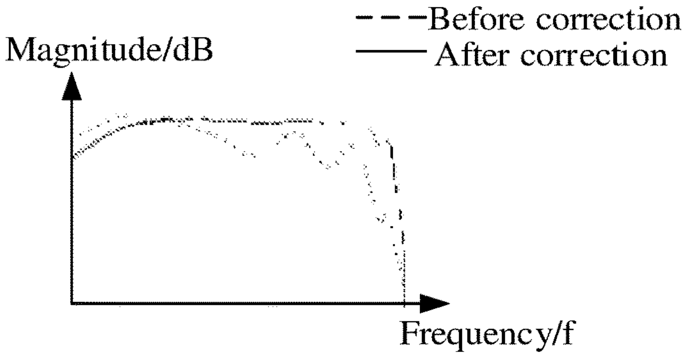
FIG. 5 is a schematic diagram showing an effect of a system frequency response correction disclosed in an embodiment of the present disclosure.

Here, the operation 308 is similar to the operation 202 above. It should be noted that when the above target equalizer parameter is calculated using the system correction parameter calculation method exemplified in the above embodiment, the earphone can specifically use the target equalizer configured based on the target equalizer parameter to perform equalization and correction on the initial audio signal, to obtain the corrected audio signal. Exemplarily, as shown in FIG. 5, which is a schematic diagram showing the effect of system frequency response correction disclosed in an embodiment of the present disclosure, the dotted line represents the system frequency response before the system frequency response correction, and the solid line represents the system frequency response after the system frequency response correction. It can be seen that by performing the above system frequency response correction, the system frequency response is made flatter and the linear phase is maintained, which is beneficial to eliminate as much ambient impact on the audio signal during transmission as possible.

It can be understood that the above system correction parameter can not only be calculated during the actual use by the user, but also can be stored in advance in a built-in storage module of the earphone before the actual use by the user (that is, at manufacture). For example, when the earphone needs to perform system frequency response correction on the initial audio signal to obtain the corrected audio signal for subsequent hearing test and audio signal compensation, the pre-stored system correction parameter can be obtained from its storage module, and then the system frequency response correction can be performed on the initial audio signal used for hearing test according to the system correction parameter.

Specifically, at manufacture, in order to obtain the above system correction parameter, corresponding detection may be performed in advance for the earphone. For example, the system correction parameter may be calculated according to the method shown in the Operations 302 to 306 above. In some embodiments, after obtaining the system correction parameter, the corresponding system calibration of the earphone can also be directly performed according to the system correction parameter, such that the system calibration of the earphone can be completed at manufacture, which is convenient to perform hearing test and audio signal compensation directly while the user is using the earphone in actual use.

It should be noted that the above system calibration may include correction of a frequency response difference of each frequency point in the audio system where the earphone is located, such that when the earphone performs hearing test subsequently, the audio signal amplitude corresponding to each frequency point (especially each frequency point to be detected) can be kept at the same level, that is, the reference sound intensity corresponding to each frequency point is equal or similar (for example, within a certain threshold range), which facilitates improving the accuracy and reliability of hearing test. It may also include calibration for differences in the earphone's own acoustic devices, assembly processes, etc., such that system deviations caused by hardware differences between different earphones can be reduced. In some embodiments, the above two system calibrations may be performed in corresponding operations, respectively, or may be combined, and the embodiment of the present disclosure is not limited to this. Exemplarily, the former system calibration can be completed at manufacture of the earphone, and the latter system calibration can be performed during the actual use of the user (that is, using the method shown in the Operations 302 to 306 above). Alternatively, the two system calibrations may be combined and completed at manufacture of the earphone, or during the actual use of the earphone by the user.

Operation 310, the corrected audio signal is outputted via the speaker.

Operation 312, hearing test information fed back for the corrected audio signal is obtained.

Operation 314, a compensation parameter is determined according to the hearing test information, the compensation parameter being used to compensate a target audio signal to be outputted.

Herein, the Operations 310, 312, and 314 are similar to the above Operations 204, 206, and 208, and details thereof will be omitted here.

In some embodiments, if the above compensation parameter is determined at manufacture of the earphone (for example, based on human experience or big data analysis results, corresponding compensation parameters are specified in advance for some typical and common hearing test information), the earphone can directly obtain the corresponding compensation parameter, and use it to compensate the target audio signal to be outputted by the speaker.

It can be seen that the audio signal compensation method described in the above embodiment can obtain the user's actual hearing test information more accurately, thereby improving the flexibility and accuracy of audio signal compensation based on the hearing test results. In addition, the system frequency response correction is performed by means of equalization, achieving the amplitude equalization with the goal of flat amplitude frequency response and the phase equalization with the goal of linear phase, which is beneficial to eliminate as much ambient impact on the audio signal during the transmission process as possible.

Figure 6:
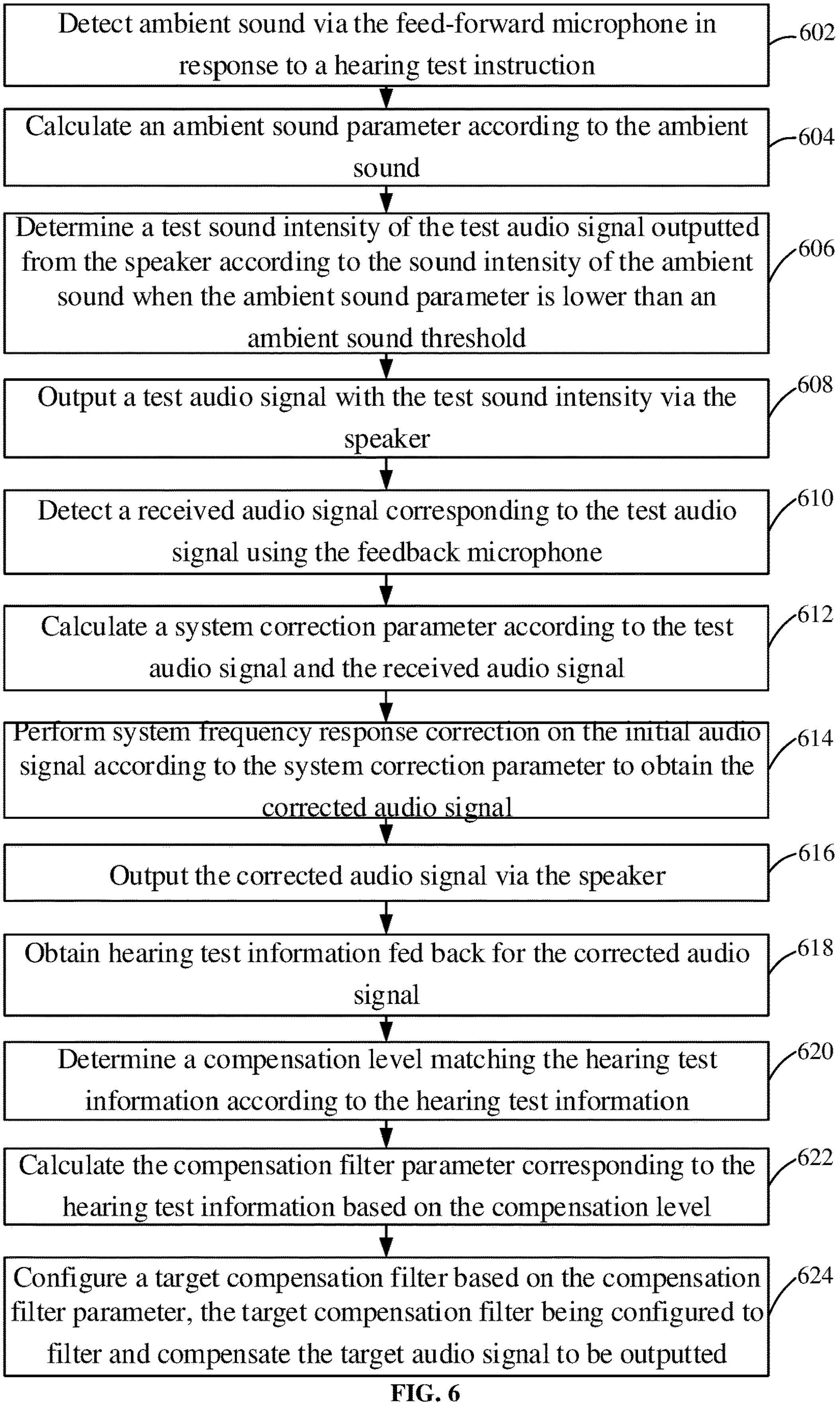
FIG. 6 is a schematic flowchart illustrating another audio signal compensation method disclosed in an embodiment of the present disclosure.

Reference is made to FIG. 6, which is a schematic flowchart illustrating another audio signal compensation method disclosed in an embodiment of the present disclosure. The method can be applied in the above earphone, and the earphone can include a speaker, a feedback microphone, and a feed-forward microphone. As shown in FIG. 6, the audio signal compensation method may include the following operations.

Operation 602, ambient sound is detected via the feed-forward microphone in response to a hearing test instruction.

Here, the above hearing test instruction may include a hearing test operation performed by the user directly on the earphone (such as a specified touch operation, voice operation, mobile operation, etc.), or may include the user's hearing test operation performed on a terminal device communicatively connected to the earphone (such as a specified touch operation, button click operation, etc.). For the latter, when the terminal device detects a hearing test operation, it can also transmit a corresponding hearing test instruction to the earphone. On this basis, when the earphone detects a hearing test operation for itself, or receives a hearing test instruction transmitted by the terminal device connected to it, it can trigger its feed-forward microphone to detect external ambient sound.

At 604, an ambient sound parameter is calculated according to the ambient sound.

Exemplarily, the ambient sound parameter may include various parameters representing the strength of ambient noise, such as sound intensity, sound energy, sound power, and the like. In an embodiment of the present disclosure, after the earphone detects the ambient sound via its feed-forward microphone, it can analyze the ambient sound to calculate its corresponding ambient sound parameter.

Exemplarily, taking the ambient sound parameter including sound energy as an example, for the ambient sound detected by the feed-forward microphone, a built-in processor of the earphone can first perform windowing segmentation on the ambient sound according to a unit window length to obtain at least one frame of ambient sound sub-signal. Here, the windowing function used for windowing segmentation of the ambient sound may include a rectangular windowing function as shown in the above Equation 1, or other forms of windowing functions, such as a triangular windowing function, a Hamming windowing function, and the like. In some embodiments, in order to reduce the calculation amount before and after the windowing segmentation, the above windowing segmentation operation can be performed by using a rectangular windowing function only.

On this basis, the built-in processor of the earphone can separately calculate the short-term average energy of each frame of the ambient sound sub-signal, and smooth the calculated short-term average energy to obtain the ambient sound parameter corresponding to the ambient sound. Exemplarily, when calculating the short-term average energy of each frame of the ambient sound sub-signal, the calculation can be performed according to Equation 4:

$$E_n = \sum_{m=-\infty}^{+\infty} [x(m)w(n-m)]^2 = \sum_{m=n-(N-1)}^{n} [x(m)w(n-m)]^2 \quad \text{Equation 4}$$

where $E_n$ represents the short-term average energy of the ambient sound sub-signal in the n-th frame (or at the n moment), n is the discrete time, w(n−m) is the time-shift representation of the window function w(n), x(m) represents the ambient sound sub-signal of each frame, and N is the unit window length. By calculating the short-term average energy of the ambient sound sub-signal, the strength of a certain frame of ambient sound sub-signal can be quickly determined, so as to reduce the calculation amount related to the ambient sound parameter in a subsequent operation. Further, after obtaining the short-term average energy of each frame of ambient sound sub-signal, smoothing can be further performed according to Equation 5:

$$E_n(m)=\alpha\cdot E_n(m-1)+(1-\alpha)\cdot E_n(m), 0<\alpha<1 \quad \text{Equation 5:}$$

where $E_n(m)$ is the smoothed audio signal energy, and a is the coefficient for performing the above exponential smoothing. The built-in processor of the earphone can determine the smoothed audio signal energy $E_n(m)$ as the ambient sound parameter corresponding to the above ambient sound.

At 606, when the ambient sound parameter is lower than an ambient sound threshold, a test sound intensity of the test audio signal outputted from the speaker is determined according to the sound intensity of the ambient sound.

Exemplarily, the earphone may compare the above ambient sound parameter with an ambient sound threshold (such as 5 dB, 10 dB, etc.), and may determine whether to proceed with a subsequent operation according to the comparison result. Specifically, if the ambient sound parameter is lower than the ambient sound threshold, it means that the ambient sound of the environment where the earphone is located has little impact, and the subsequent operation such as hearing test can be performed. When the ambient sound parameter is higher than the ambient sound threshold, it means that the ambient sound of the environment where the earphone is located has great impact, and the execution of the subsequent operation can be suspended. In some embodiments, when it is determined that the ambient sound parameter is higher than the ambient sound threshold, the earphone may output corresponding reminder information via the speaker to remind the user to change to an environment with less ambient sound (especially less ambient noise) to reduce the impact of the ambient sound on the subsequent operation such as hearing test, thereby ensuring the accuracy and reliability of audio signal compensation based on the hearing test results. For example, if the ambient sound parameter is higher than the ambient sound threshold, the earphone may output first prompt information, which is used to guide the user to transfer to a quiet environment. On this basis, the earphone can detect new ambient sound via its feed-forward microphone in response to the hearing test instruction, and calculate a new ambient sound parameter for further comparison with the ambient sound threshold. The above operations can be repeated until the calculated ambient sound parameter is not higher than the ambient sound threshold.

In an embodiment of the present disclosure, when the earphone determines that the ambient sound parameter is lower than the ambient sound threshold, it may further determine the test sound intensity of the test audio signal outputted by the speaker subsequently. Exemplarily, the test audio signal may include a white noise signal, and the test sound intensity of the white noise signal may be positively correlated with the sound intensity of the ambient sound detected by the feed-forward microphone. On this basis, the earphone can calculate the test sound intensity corresponding to the white noise signal according to the sound intensity of the ambient sound and the specified positive correlation function, so as to output a white noise signal with the test sound intensity in a subsequent operation, so as to improve the signal-to-noise ratio of the audio signal and avoid the impact of the ambient sound on the system frequency response correction.

Operation 608, a test audio signal with the test sound intensity is outputted via the speaker.

Here, the Operation 608 is similar to the above Operation 302, and details thereof will be omitted here.

Operation 610, a received audio signal corresponding to the test audio signal is detected by using the feedback microphone.

Operation 612, a system correction parameter is calculated according to the test audio signal and the received audio signal.

Operation 614, system frequency response correction is performed on the initial audio signal according to the system correction parameter to obtain the corrected audio signal.

Here, the Operations 610, 612, and 614 are similar to the above Operations 304, 306, and 308, and details thereof will be omitted here.

In some embodiments, when the earphone detects the ambient sound in the above Operation 602, the Active Noise Cancellation (ANC) function can be enabled accordingly, so as to perform subsequent hearing test and audio signal compensation in a noise reduction environment. For example, after the earphone with the ANC function enabled detects the ambient sound via its feed-forward microphone in response to the hearing test instruction, it can determine a reverse audio signal corresponding to the ambient sound according to the ambient sound, and then can output the reverse audio signal via its speaker, for cancelling the ambient sound to form an active noise reduction environment. On this basis, when the earphone performs the above Operation 614, it may specifically perform system frequency response correction on the initial audio signal in the active noise reduction environment to obtain the corrected audio signal, and then output the corrected audio signal in the active noise reduction environment to reduce the interference of the ambient noise on the hearing test process.

In some embodiments, after the ANC function is enabled, the earphone can further detect a residual noise signal after active noise reduction (that is, the residual ambient sound) via its feedback microphone, and when the residual noise signal is still large, output corresponding reminder information via the speaker to remind the user to change to an environment with less ambient sound (especially less ambient noise), so as to further reduce the impact of ambient sound on subsequent operations such as hearing test, thereby ensuring the accuracy and reliability of audio signal compensation based on the hearing test results. Exemplarily, the earphone can calculate a residual noise parameter according to the above residual noise signal, and if the residual noise parameter is higher than a residual noise threshold, the earphone can output second prompt information, which is used to guide the user to transfer to a quiet environment. On this basis, the earphone can re-detect an ambient sound via its feed-forward microphone in response to the hearing test command again, and continue to perform corresponding noise reduction processing until the residual noise parameter detected via its feedback microphone is not higher than the residual noise threshold.

Operation 616, the corrected audio signal is outputted via the speaker.

Here, the Operation 616 is similar to the above Operation 204 and details thereof will be omitted here.

Operation 618, hearing test information fed back for the corrected audio signal is obtained.

Here, the Operation 618 is similar to the above Operation 206. It should be noted that, in some embodiments, if there are N frequency points to be detected in the hearing test process (such as 500 Hz frequency point, 1000 Hz frequency point, 2000 Hz frequency point, etc.), the earphone can obtain N pieces of corresponding hearing test information, each corresponding to one of the N frequency points to be detected, where N is a positive integer greater than or equal to 1.

Exemplarily, before performing system frequency response correction on the initial audio signal according to the system correction parameter, the earphone can first set N frequency points to be detected, and generate N corresponding initial audio signals each corresponding to one of the N frequency points to be detected. On this basis, after the earphone performs the system frequency response correction on each initial audio signal according to the system correction parameter and obtains the N corresponding corrected audio signals, N pieces of hearing test information each fed back for one corrected audio signal can be obtained. It can be understood that each frequency point to be detected can cover a certain frequency range, so as to conduct a more comprehensive detection of the user's hearing characteristics in different frequency bands (i.e., sensitivity to audio signals in different frequency bands), and it is also beneficial to reduce the number of detections and save the detection time. Exemplarily, the above frequency points to be detected may include mid and low frequency points such as 500 Hz, 1000 Hz, and 2000 Hz, and may also include high frequency points such as 4000 Hz, 6000 Hz, and 8000 Hz.

In one embodiment, after the earphone generates the above N initial audio signals, a reference sound intensity corresponding to each frequency point to be detected can be determined, and according to the reference sound intensity corresponding to each frequency point to be detected, a corrected audio signal with the corresponding reference sound intensity is outputted via the speaker, so as to obtain N pieces of hearing test information fed back for each corrected audio signal. Here, the above reference sound intensity can be determined according to relevant medical standards, or can be specified according to experimental experience of hearing test, such that the output can be provided as close as possible to the critical sound intensity at which the user can hear the corrected audio signal, thereby reducing the number of subsequent volume adjustments required and improving the efficiency of hearing test. Exemplarily, after the earphone determines the frequency points to be detected, the reference sound intensities corresponding to the frequency points to be detected may be obtained referring to a lookup table. Here, the above reference sound intensities may include Sound Pressure Levels (SPLs). For example, for a frequency point to be detected of 500 Hz, the reference sound intensity can be determined to be 11.50 dB SPL referring to a lookup table. For the frequency point to be detected of 4000 Hz, the reference sound intensity can be determined to be 9.50 dB SPL referring to a lookup table.

Further, when the earphone outputs the corrected audio signal according to a certain sound intensity (such as the above reference sound intensity), it can output the corrected audio signal by gradually increasing the required sound intensity from low to high. For example, when the earphone needs to play the corrected audio signal corresponding to a certain frequency point to be detected via its speaker, if the reference sound intensity corresponding to the frequency point to be detected is xdB SPL, then the earphone can first output a pure tone signal at the frequency point to be detected with the sound intensity lower than xdB SPL, and gradually increases the sound intensity to xdB SPL, such that the process of outputting the corrected audio signal is more natural and smooth, thereby avoiding plosive sounds and improving the user's listening experience.

In one embodiment, when the earphone obtains the hearing test information fed back for each corrected audio signal, it can repeatedly adjust the sound intensity of the outputted corrected audio signal according to the hearing state regarding whether the user can hear the corrected audio signal, until the critical sound intensity of the corrected audio signal at which the user can just hear the corrected audio signal is obtained.

Exemplarily, the earphone may first obtain the hearing state fed back for the corrected audio signal corresponding to a first frequency point, where the first frequency point may be any one of the above N frequency points to be detected. Then, the earphone can adjust a first sound intensity of the corrected audio signal according to the hearing state to determine a sound intensity threshold corresponding to the first frequency point, and the sound intensity threshold is the critical sound intensity at which the user can hear the corrected audio signal. Specifically, for example, if the hearing state indicates that the first sound intensity of the corrected audio signal does not meet the critical condition, the earphone can adjust the sound intensity of the corrected audio signal, and then output the adjusted corrected audio signal via its speaker, and re-execute the above operation of obtaining the hearing state fed back for the corrected audio signal corresponding to the first frequency point, until the obtained first sound intensity of the corrected audio signal meets the critical condition. On this basis, the earphone may determine the first sound intensity of the corrected audio signal meeting the critical condition (i.e., the sound intensity threshold) as the hearing test information corresponding to the first frequency point. Here, the above critical condition may refer to a situation where the user can just hear the corrected audio signal.

Specifically, when adjusting the sound intensity of the corrected audio signal, if the hearing state indicates that the first sound intensity of the corrected audio signal does not belong to an audible range, the earphone can increase the first sound intensity of the corrected audio signal by a first adjustment parameter. If the hearing state indicates that the first sound intensity of the corrected audio signal belongs to the audible range, then the earphone may decrease the first sound intensity of the corrected audio signal by a second adjustment parameter. In some embodiments, the above first adjustment parameter may be greater than the second adjustment parameter. For example, if the above first adjustment parameter is 24 dB, and the second adjustment parameter is 8 dB, then when the user feeds back that the corrected audio signal cannot be heard, the sound intensity of the corrected audio signal can be increased by 24 dB; or when the user feeds back that the corrected audio signal can be heard, the sound intensity of the corrected audio signal can be decreased by 8 dB. With repeated increasing/decreasing adjustments, the sound intensity range within which the user can hear the corrected audio signal at the frequency point can be narrowed down to within ±8 dB of the sound intensity threshold at which the user can just hear the corrected audio signal. Then, the first sound intensity of the corrected audio signal that meets the critical condition, or the above sound intensity range, can be determined as the hearing test information fed back by the user for the corrected audio signal.

Further, in some embodiments, the values of the above first adjustment parameter and the second adjustment parameter may have a negative correlation with the number of times the first sound intensity is adjusted, that is, as the number of times the first sound intensity is repeatedly adjusted increases, the value of the first adjustment parameter or the second adjustment parameter used for the adjustment each time can be decreased accordingly.

Exemplarily, the value of the first adjustment parameter or the second adjustment parameter used in each adjustment can be ½, ⅓, etc. of the value used in last adjustment, so as to gradually approach the sound intensity threshold at which the user can just hear the corrected audio signal. Specifically, for example, when the earphone outputs the corrected audio signal, the first sound intensity of the corrected audio signal can be represented by a gain, and the reference sound intensity used for the initial output can be regarded as a reference gain (set to xdB SPL), and a corresponding upper limit gain PU and a corresponding lower limit gain PD can be set. If the hearing state fed back by the user indicates that the user can hear the corrected audio signal at the current gain (the above reference gain xdB SPL is used for the initial output), the earphone can reduce the gain by $PD/2^t$ dB SPL on the basis of the current gain, and output the corrected audio signal according to the decreased gain again. If the hearing state fed back by the user indicates that the user cannot hear the corrected audio signal, the earphone can increase the gain by $PU/2^t$ dB SPL on the basis of the current gain, and output the corrected audio signal again according to the increased gain. Here, t represents the number of times the earphone performs gain adjustment, that is, the number of times the first sound intensity for outputting the corrected audio signal is adjusted by means of interaction with the user. On this basis, with the method of adjusting the gain by half, the user can quickly determine the sound intensity threshold at which the corrected audio signal can be heard at each frequency point to be detected with a limited number of interactive adjustments, such that it can be determined as the hearing test information fed back by the user for the corrected audio signal, which greatly improves the efficiency of the hearing test.

In some embodiments, when the earphone actually outputs the above corrected audio signal, based on the gain variation $Un_t$ used for each adjustment, i.e., $Un_t=PD/2^t$ or $Un_t=PU/2^t$, the actually outputted total gain Tn can be expressed as: Tn=P0+Un+Cn, where P0 is a digital reference gain of the earphone; $Un=\Sigma Un_t$, which varies according to the times of interactive adjustment; and Cn is a constant.

With the above method, the hearing test can be achieved with simple interactive operations, without a special environment such as a silent room or an anechoic room, and a relatively accurate hearing test result can be obtained, which is conducive to improving the flexibility and convenience in audio signal compensation based on the hearing test result.

Operation 620, a compensation level matching the hearing test information is determined according to the hearing test information.

In an embodiment of the present disclosure, according to the above hearing test information, the earphone can define a compensation level for the corresponding user's hearing characteristics, such that the compensation level matching the hearing test information can be determined. It can be understood that, for different compensation levels, the compensation degrees of the audio signal compensation performed by the earphone may be different. Exemplarily, in some embodiments, when the hearing test information indicates that the user has relatively large hearing impairment, it may be determined that the compensation level matching the hearing test information is a relatively high compensation level, such that when the target audio signal to be outputted is compensated subsequently, a large gain coefficient, a small quality factor, etc. can be provided. In some other embodiments, when the hearing test information indicates that the user's hearing impairment is relatively small, a low compensation level can be determined accordingly, such that when the target audio signal to be outputted is compensated subsequently, a small gain coefficient, a large quality factor, etc. can be provided.

Operation 622, the compensation filter parameter corresponding to the hearing test information is calculated based on the compensation level.

Exemplarily, the above compensation filter parameter may include a gain coefficient (Gain) value of a corresponding target compensation filter, a quality factor (Q) value, and the like.

In an embodiment, different compensation levels may correspond to differentiated compensation filter parameter calculation methods, such that after the earphone determines the compensation level matching the hearing test information, the parameter calculation method corresponding to the compensation level may be invoked to calculate the compensation filter parameter corresponding to the hearing test information.

In another embodiment, different compensation levels may correspond to differentiated compensation filter parameters, and the correspondence and the above compensation filter parameters may be stored in a built-in memory of the earphone, such that when the earphone determines the compensation level matching the hearing test information, the compensation filter parameter corresponding to the compensation level can be directly invoked.

In some embodiments, the target compensation filter obtained based on the above compensation filter parameter configuration may include an IIR filter. For hearing test information at a certain frequency point, a corresponding IIR filter may be used to achieve the audio signal compensation. Exemplarily, when a second-order IIR filter is used as the target compensation filter, the second-order IIR filter can be expressed as follows by a difference equation shown in Equation 6:

$$y(n)=\sum_{i=0}^{M}a_ix(n-i)+\sum_{i=1}^{M}b_iy(n-i) \quad \text{Equation 6}$$

where $a_0=1+\alpha/A$, $a_1=-2\cos(w_0)$, $a_2=1-\alpha/A$, $b_0=1+\alpha\cdot A$, $b_1=-2\cos(w_0)$, $b_2=1-\alpha\cdot A$, and further, $w_0=2\pi f_0/f_s$, $A=10^{Gain/40}$, $\alpha=\sin(w_0)/(2Q)$ where $f_0$ is the center frequency of the compensation filter, $f_s$ is the sampling rate of the target audio signal to be outputted, Gain is the gain coefficient of the compensation filter, and Q is the quality factor of the compensation filter. In some embodiments, for different frequency points, different second-order IIR filters may be selected for compensation. Exemplarily, the second-order IIR filter may include a Low Shelf Filter, a High Shelf Filter, a Peaking Filter, etc., and the embodiment of the present disclosure is not limited to this. For example, for low frequency points such as 500 Hz, a Low Shelf Filter can be used; and for specific high frequency points such as 8000 Hz, a Peaking Filter can be used.

Operation 624, a target compensation filter is configured based on the compensation filter parameter, the target compensation filter being configured to filter and compensate the target audio signal to be outputted.

In an embodiment of the present disclosure, the earphone can obtain a corresponding target compensation filter based on the above compensation filter parameter configuration. Exemplarily, after the earphone obtains the hearing test information, the center frequency $f_0$ of the target compensation filter and the sampling rate $f_s$ of the target audio signal to be outputted by the earphone via the speaker can be determined according to the frequency point corresponding to the hearing test information. On this basis, after the earphone determines the matching compensation level according to the hearing test information, the gain coefficient (Gain) value and the quality factor (Q) value of the target compensation filter corresponding to the compensation level can be further obtained, such that the corresponding target compensation filter can be configured according to the compensation filter parameter, for filtering and compensating the target audio signal to be outputted by the speaker.

Figure 7:
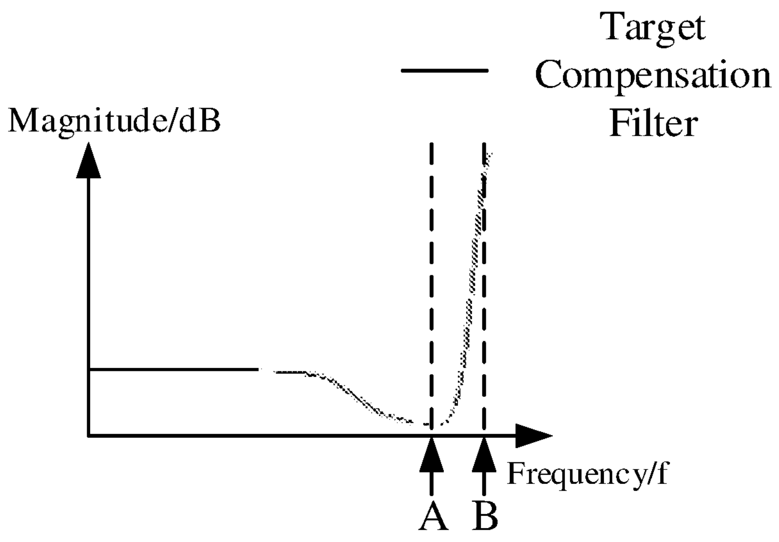
FIG. 7 is a schematic diagram showing a frequency response of a target compensation filter disclosed in an embodiment of the present disclosure.
Figure 8:
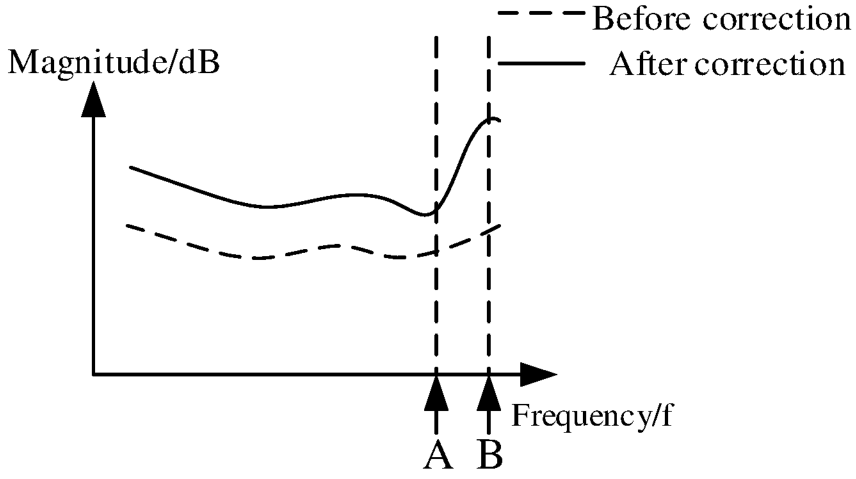
FIG. 8 is a schematic diagram showing an effect of audio signal compensation using the target compensation filter shown in FIG. 7.

Exemplarily, referring to FIG. 7 and FIG. 8 together, after the above compensation filter parameter is determined, the frequency response of the target compensation filter configured based on the compensation filter parameter can be as shown in FIG. 7, and the effect of using the target compensation filter to compensate the target audio signal to be outputted by the earphone can be shown in FIG. 8. The dotted line in FIG. 8 represents the system frequency response before filtering and compensation, and the solid line represents the system frequency response after filtering and compensation. It can be seen that the corresponding compensation at frequency point A in FIG. 7 is relatively small, and accordingly the filtering and compensation effect near frequency point A in FIG. 8 is not obvious. The corresponding compensation at frequency point B in FIG. 7 is relatively large, and accordingly the filtering and compensation near frequency point B in FIG. 8 is more obvious.

In some embodiments, when there are a plurality of frequency points to be detected in the hearing test process, the earphone can first obtain the hearing test information at each frequency point to be detected, and then can calculate a plurality of sets of compensation filter parameters corresponding to the above hearing test information, and configure a plurality of target compensation filters based on the plurality of sets of compensation filter parameters. For example, if there are M frequency points to be detected, the earphone can configure M corresponding target compensation filters according to the compensation filter parameter corresponding to each frequency point to be detected, and each of the M target compensation filters corresponds to one of the M frequency points to be detected, where M is a positive integer greater than or equal to 1. On this basis, the earphone can cascade the M target compensation filters, such that the target audio signal to be outputted can be filtered and compensated using the cascaded M target compensation filters together.

In some embodiments, the above filter compensation parameter may include a gain coefficient, and when the earphone configures target compensation filters for different frequency points, different gain coefficients may be determined according to each frequency point, and then the target compensation filter corresponding to each frequency point may be configured according to the gain coefficient, to achieve nonlinear gain compensation. For example, if there are P frequency points to be detected (P is a positive integer greater than or equal to 1), the earphone may determine the gain coefficient corresponding to the compensation level of each frequency point to be detected according to the compensation level corresponding to the frequency point to be detected. Here, for different frequency points to be detected, the gain coefficients corresponding to the same compensation level may be the same or different. On this basis, if a second frequency point is any one of the above P frequency points to be detected, the earphone can configure the target compensation filter corresponding to the second frequency point according to the gain coefficient corresponding to the second frequency point. The target compensation filter is used for performing gain compensation according to the gain coefficient corresponding to the second frequency point for the signal component corresponding to the second frequency point in the target audio signal to be outputted. With the above method, targeted compensation can be performed for each frequency component (or signal component) in the target audio signal, which improves the flexibility of compensation for the target audio signal.

In some embodiments, according to the hearing test information fed back by the user, the earphone may also perform differentiated adjustments on the gain coefficients corresponding to the respective frequency points based on the user's different sensitivities to audio signals at different frequencies. For example, the earphone can set the gain coefficient corresponding to the frequency point with better hearing characteristics of the user (that is, the user's high sensitivity) as an attenuating gain coefficient, e.g., a negative value, minus a specified gain adjustment coefficient, etc., or set the gain coefficient corresponding to the frequency point with poor user hearing characteristics (that is, the user's low sensitivity) as an enhancing gain coefficient, e.g., a positive value, plus a specified gain adjustment coefficient, etc. Therefore, the earphone can not only flexibly adjust the target audio signal to be outputted, but also achieve overall audio signal processing, such that the compensated system frequency response curve is smoother and the sound quality is more comfortable. In some embodiments, even if the hearing test information fed back by the user indicates that the user's sensitivities to audio signals of different frequencies are similar or the same, the earphone can still set a default gain coefficient, so as to configure the target compensation filter based on the default gain coefficient, for compensating the target audio signal to be outputted, such that the user can feel the effect of the optimized compensation and the user experience can be improved.

In some embodiments, the earphone can also perform a corresponding weighting process on the above hearing test information in advance for different frequency points, such that when the gain coefficient corresponding to each frequency point is subsequently determined according to the hearing test information, an effect similar to the above gain factor adjustment can be achieved.

In some other embodiments, if the gain coefficient(s) corresponding to one or more consecutive frequency points is too large (for example, greater than a specified gain threshold), the earphone can further determine an attenuating coefficient that matches the gain coefficient, so as to configure the target compensation filter(s) corresponding to the one or more frequency points according to the gain coefficient(s) and attenuation coefficient. Here, with the above attenuating coefficient, it is equivalent to connecting a corresponding attenuating filter (such as Low Shelf Filter, High Shelf Filter, etc.) after the compensation filter configured based on the above gain coefficient, so as to prevent the overall gain of the target compensation filter from overflowing unexpectedly, thereby ensuring the reliability of compensation of the target audio signal.

In some other embodiments, after the earphone determines the gain coefficient corresponding to a certain frequency point, it may further determine the gain coefficients corresponding to a number of frequency points adjacent to the frequency point. Here, the correspondence of gain coefficients of adjacent frequency points can be obtained based on specified functional relationship operations, or can be obtained based on a large amount of data training, which is conducive to reducing the number of detections and saving detection time.

In some embodiments, the earphone may also analyze its output historical audio, or trigger a terminal device connected to the earphone to analyze its output historical audio, to obtain a target audio style that matches the user. Exemplarily, the target audio style may include an audio style preferred by the user, such as pure music, metal, rock and so on. On this basis, the earphone can determine a style adjustment parameter corresponding to the target audio style according to the target audio style, and further adjust the above compensation filter parameter according to the style adjustment parameter, so as to configure a new target compensation filter based on the adjusted compensation filter parameter. With the above method, corresponding compensation filtering can be performed based on the target audio style matching the user, such that personalized sound effect compensation can be achieved, and the flexibility of audio signal compensation can be further improved. In some embodiments, the earphone can also determine the target audio style that matches the user according to the user's age, occupation, work and rest habits, etc., and then perform the above operation of determining the style adjustment parameter corresponding to the target audio style, and further adjusting the above compensation filter parameter according to the style adjustment parameter, thereby further improving the pertinence and adaptability of the audio signal compensation, and improving the effect of compensation of the target audio signal.

It can be seen that with the audio signal compensation method described in the above embodiment, the user's actual hearing test information can be obtained more accurately, thereby improving the flexibility and accuracy of audio signal compensation based on the hearing test results. In addition, by using simple interactive operations, the hearing test can be achieved without special environments such as silent rooms or anechoic rooms, and relatively accurate hearing test results can be obtained, which is conducive to improving the flexibility and convenience of audio signal compensation based on hearing test results. Further, the filtering and compensation method can effectively perform real-time compensation on the target audio signal to be outputted, and further improve the flexibility and accuracy of audio signal compensation based on the hearing test results.

Figure 9:
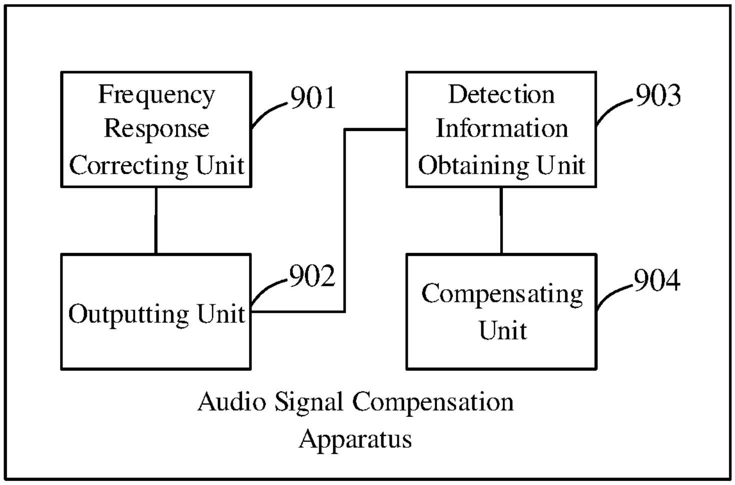
FIG. 9 is a schematic diagram showing modules of an audio signal compensation apparatus disclosed in an embodiment of the present disclosure.

Reference is made to FIG. 9, which is a schematic diagram showing modules of an audio signal compensation apparatus disclosed in an embodiment of the present disclosure. The audio signal compensation apparatus may be applied in the above earphone, and the earphone may include a speaker, a feedback microphone, and a feed-forward microphone. As shown in FIG. 9, the audio signal compensation apparatus may include a frequency response correcting unit 901, an outputting unit 902, a detection information obtaining unit 903, and a compensating unit 904.

The frequency response correcting unit 901 is configured to perform system frequency response correction on an initial audio signal to obtain a corrected audio signal.

The outputting unit 902 is configured to output the corrected audio signal via the speaker.

The detection information obtaining unit 903 is configured to obtain hearing test information fed back for the corrected audio signal.

The compensating unit 904 is configured to determine a compensation parameter according to the hearing test information, the compensation parameter being used to compensate a target audio signal to be outputted.

In an embodiment, the audio signal compensation apparatus may further include a receiving unit and a computing unit (not shown).

The above outputting unit 902 may be further configured to, before the frequency response correcting unit 903 performs the system frequency response correction on the initial audio signal to obtain the corrected audio signal: output a test audio signal via the speaker.

The receiving unit is configured to detect a received audio signal corresponding to the test audio signal via the feedback microphone.

The calculating unit is configured to calculate a system correction parameter according to the test audio signal and the received audio signal.

The above frequency response correcting unit 901 may be configured to perform the system frequency response correction on the initial audio signal according to the system correction parameter to obtain the corrected audio signal.

In an embodiment, the audio signal compensation apparatus may further include a determining unit (not shown).

The above receiving unit may be further configured to, before the outputting unit 902 outputs the test audio signal via the speaker: detect ambient sound via the feed-forward microphone.

The determining unit is configured to determine a test sound intensity of the test audio signal outputted from the speaker according to an ambient sound intensity of the ambient sound.

The above outputting unit 902 may be configured to output the test audio signal with the test sound intensity via the speaker.

Exemplarily, the test audio signal may include a white noise signal having a test sound intensity that is positively correlated with the ambient sound intensity of the ambient sound detected by the feed-forward microphone.

In one embodiment, the system correction parameter may include a target equalizer parameter, and the calculating unit may be configured to perform Fourier transform on each of the test audio signal and the received audio signal; compare the Fourier transformed received audio signal with the Fourier transformed test audio signal to obtain a system frequency response; and calculate the target equalizer parameter according to the system frequency response based on a Least Square criterion.

The above frequency response correcting unit 901 may be configured to perform equalization correction on the initial audio signal using a target equalizer configured based on the target equalizer parameter, to obtain the corrected audio signal.

Exemplarily, the target equalizer may include an equalizer composed of a Finite Impulse Response (FIR) filter.

In an embodiment, the above receiving unit may be further configured to, before the frequency response correcting unit performs the system frequency response correction on the initial audio signal to obtain the corrected audio signal: detect ambient sound via the feed-forward microphone in response to a hearing test instruction.

The above calculating unit may be further configured to calculate an ambient sound parameter according to the ambient sound, and when the ambient sound parameter is lower than an ambient sound threshold, trigger the frequency response correcting unit 901 to perform the operation of performing the system frequency response correction on the initial audio signal to obtain the corrected audio signal.

Here, the above calculating unit may be configured to perform windowing segmentation on the ambient sound according to a unit window length to obtain at least one frame of ambient sound sub-signal; calculate short-term average energy of each frame of ambient sound sub-signal; and smooth the short-term average energy of each frame of ambient sound sub-signal to obtain the ambient sound parameter corresponding to the ambient sound.

In an embodiment, the audio signal compensation apparatus may further include a setting unit (not shown).

The setting unit is configured to set N frequency points to be detected, and generate N initial audio signals corresponding to the N frequency points to be detected, respectively, each of the N initial audio signals corresponding to one of the N frequency points to be detected, where N is a positive integer greater than or equal to 1.

The above determining unit may be further configured to determine a reference sound intensity corresponding to each frequency point to be detected.

The above outputting unit 902 may be configured to output, according to the reference sound intensity corresponding to each frequency point to be detected, the corrected audio signal with the corresponding reference sound intensity via the speaker.

In an embodiment, the above detection information obtaining unit 903 may be configured to obtain a hearing state fed back for a corrected audio signal corresponding to a first frequency point; adjust a first sound intensity of the corrected audio signal according to the hearing state to determine a sound intensity threshold corresponding to the first frequency point, the sound intensity threshold being a critical sound intensity at which a user is able to hear the corrected audio signal; and determine the sound intensity threshold as hearing test information fed back for the corrected audio signal corresponding to the first frequency point.

Here, the first sound intensity of the corrected audio signal may be increased by a first adjustment parameter when the hearing state indicates that the first sound intensity of the corrected audio signal does not belong to an audible range, or the first sound intensity of the corrected audio signal may be decreased by a second adjustment parameter when the hearing state indicates that the first sound intensity of the corrected audio signal belongs to the audible range, the first adjustment parameter being greater than the second adjustment parameter.

In an embodiment, the compensation parameter may include a compensation filter parameter, and the compensating unit 904 may be configured to: determine a compensation level matching the hearing test information according to the hearing test information; calculate the compensation filter parameter corresponding to the hearing test information based on the compensation level; and configure a target compensation filter based on the compensation filter parameter for filtering and compensating the target audio signal.

Exemplarily, the target compensation filter may include an Infinite Impulse Response (IIR) filter.

In one embodiment, if there are M frequency points to be detected, the compensating unit 904 may be configured to: configure, for M frequency points to be detected, M target compensation filters according to a compensation filter parameter corresponding to each frequency point to be detected, each of the M target compensation filters corresponding to one of the M frequency points to be detected, where M is a positive integer greater than or equal to 1; and then cascade the M target compensation filters.

In an embodiment, the compensating unit 904 may be further configured to determine a style adjustment parameter corresponding to a target audio style according to the target audio style, adjust the compensation filter parameter according to the style adjustment parameter, and configure the target compensation filter based on the adjusted compensation filter parameter.

It can be seen that with the audio signal compensation apparatus described in the above embodiment, a user can conveniently detect his/her own hearing characteristics using an earphone, and determine an appropriate detection audio signal using environment-adaptive system frequency response correction, eliminate as much ambient impact during audio signal transmission as possible, such that relatively accurate hearing test can be achieved without special environments such as silent rooms or anechoic rooms. The actual hearing test information of the user can be obtained more accurately. Further, by compensating the corresponding audio signal, it is possible to ensure that the user can hear the target audio signal outputted from the speaker, thereby further improving the flexibility and accuracy of audio signal compensation based on the hearing test results.

Figure 10:
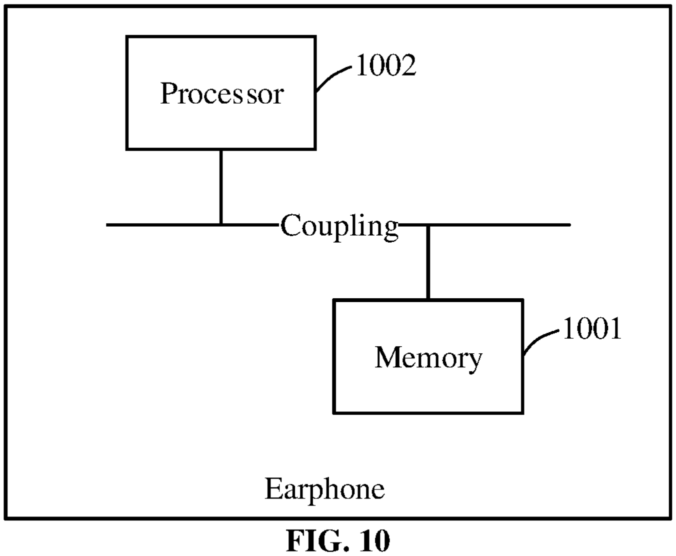
FIG. 10 is a schematic diagram showing modules of an earphone disclosed in an embodiment of the present disclosure.

Reference is made to FIG. 10, which is a schematic diagram showing modules of an earphone disclosed in an embodiment of the present disclosure. As shown in FIG. 10, the earphone may include:

a memory 1001 storing executable program codes; and a processor 1002 coupled to the memory 1001.

Here, the processor 1002 invokes the executable program codes stored in the memory 1001 to execute all or part of the operations in the audio signal compensation method described in any of the above embodiments.

In addition, an embodiment of the present disclosure further discloses a computer-readable storage medium, which stores a computer program for electronic data exchange. The computer program enables the computer to execute all or part of the operations in the audio signal compensation method described in any of the above embodiments.

In addition, an embodiment of the present disclosure further discloses a computer program product. When the computer program product is run on a computer, the computer can execute all or part of the operations in the audio signal compensation method described in any of the above embodiments.

Those of ordinary skill in the art can understand that all or part of the operations in the methods of the above embodiments can be completed by instructing related hardware according to a program, and the program can be stored in a computer-readable storage medium. The storage medium includes Read-Only Memory (ROM), Random Access Memory (RAM), Programmable Read-only Memory (PROM), Erasable Programmable Read Only Memory (EPROM), One-time Programmable Read-Only Memory (OTPROM), Electronically Erasable Programmable Read-Only Memory (EEPROM), Compact Disc Read-Only Memory (CD-ROM) or other optical disk storage, magnetic disk storage, tape storage, or any other computer-readable medium that can be used to carry or store data.

The audio signal compensation method and apparatus, earphone, and storage medium disclosed in the embodiments of the present disclosure have been described above in detail. Specific examples are used herein to illustrate the principles and implementation of the present disclosure. The descriptions of the above embodiments are only used to facilitate understanding of the method of the present disclosure and its core idea. At the same time, for those of ordinary skill in the art, according to the idea of the present disclosure, there may be changes in the specific implementations and application scopes. In summary, the content in the description should not be construed as a limitation of the present disclosure.

What is claimed is:

1. An audio signal compensation method, performed by an earphone having a speaker, the method comprising:

performing system frequency response correction on an initial audio signal to obtain a corrected audio signal;

outputting the corrected audio signal via the speaker;

obtaining hearing test information fed back for the corrected audio signal; and determining a compensation parameter according to the hearing test information, the compensation parameter being used to compensate a target audio signal to be outputted;

wherein the earphone further comprises a feedback microphone, and the method further comprising, prior to performing the system frequency response correction on the initial audio signal to obtain the corrected audio signal:

outputting a test audio signal via the speaker;

detecting a received audio signal corresponding to the test audio signal via the feedback microphone; and calculating a system correction parameter according to the test audio signal and the received audio signal, and wherein said performing the system frequency response correction on the initial audio signal to obtain the corrected audio signal comprising:

performing the system frequency response correction on the initial audio signal according to the system correction parameter to obtain the corrected audio signal;

wherein the system correction parameter comprises a target equalizer parameter, and said calculating the system correction parameter according to the test audio signal and the received audio signal comprises:

performing Fourier transform (FT) on each of the test audio signal and the received audio signal;

comparing the Fourier transformed received audio signal with the Fourier transformed test audio signal to obtain a system frequency response; and calculating the target equalizer parameter according to the system frequency response, and said performing the system frequency response correction on the initial audio signal according to the system correction parameter to obtain the corrected audio signal comprises:

performing equalization correction on the initial audio signal using a target equalizer configured based on the target equalizer parameter, to obtain the corrected audio signal.

2. The method as claimed in claim 1, wherein the earphone further comprises a feed-forward microphone, and the method further comprising, prior to outputting the test audio signal via the speaker:

detecting ambient sound via the feed-forward microphone; and determining a test sound intensity of the test audio signal outputted from the speaker according to an ambient sound intensity of the ambient sound, and wherein said outputting the test audio signal via the speaker comprises:

outputting the test audio signal with the test sound intensity via the speaker.

3. The method according to claim 2, wherein the test audio signal comprises a white noise signal having a test sound intensity that is positively correlated with the ambient sound intensity of the ambient sound detected by the feed-forward microphone.

4. The method according to claim 1, further comprising, prior to performing the system frequency response correction on the initial audio signal to obtain the corrected audio signal:

obtaining a pre-stored system correction parameter from a storage module of the earphone, wherein said performing the system frequency response correction on the initial audio signal to obtain the corrected audio signal comprises:

performing the system frequency response correction on the initial audio signal according to the system correction parameter to obtain the corrected audio signal.

5. The method according to claim 1, wherein the earphone further comprises a feed-forward microphone, and the method further comprising, prior to performing the system frequency response correction on the initial audio signal to obtain the corrected audio signal:

detecting ambient sound via the feed-forward microphone in response to a hearing test instruction; and calculating an ambient sound parameter according to the ambient sound, and the system frequency response correction is performed on the initial audio signal to obtain the corrected audio signal when the ambient sound parameter is lower than an ambient sound threshold.

6. The method according to claim 1, wherein the earphone further comprises a feed-forward microphone, and the method further comprises, prior to performing the system frequency response correction on the initial audio signal to obtain the corrected audio signal:

detecting ambient sound via the feed-forward microphone in response to a hearing test instruction;

determining a reverse audio signal corresponding to the ambient sound according to the ambient sound; and outputting the reverse audio signal via the speaker, the reverse audio signal being used to cancel the ambient sound to form an active noise reduction environment, and said performing the system frequency response correction on the initial audio signal to obtain the corrected audio signal comprises:

performing the system frequency response correction on the initial audio signal in the active noise reduction environment, to obtain the corrected audio signal.

7. The method according to claim 6, wherein the method further comprises, subsequent to outputting the reverse audio signal via the speaker:

detecting an active-noise-reduced residual noise signal via the feedback microphone;

calculating a residual noise parameter according to the residual noise signal; and outputting second prompt information when the residual noise parameter is higher than a residual noise threshold, the second prompt information being used to guide a user to transfer to a quiet environment for re-detecting ambient sound via the feed-forward microphone in response to another hearing test instruction, until the residual noise parameter is not higher than the residual noise threshold.

8. The method according to claim 1, further comprising, prior to performing the system frequency response correction on the initial audio signal to obtain the corrected audio signal:

setting N frequency points to be detected, and generating N initial audio signals corresponding to the N frequency points to be detected, respectively, where N is a positive integer greater than or equal to 1; and determining a reference sound intensity corresponding to each frequency point to be detected, wherein said outputting the corrected audio signal via the speaker comprises:

outputting, according to the reference sound intensity corresponding to each frequency point to be detected, the corrected audio signal with the corresponding reference sound intensity via the speaker.

9. The method according to claim 1, wherein said obtaining the hearing test information fed back for the corrected audio signal comprises:

obtaining a hearing state fed back for a corrected audio signal corresponding to a first frequency point;

adjusting a first sound intensity of the corrected audio signal according to the hearing state to determine a sound intensity threshold corresponding to the first frequency point, the sound intensity threshold being a critical sound intensity at which a user is able to hear the corrected audio signal; and determining the sound intensity threshold as hearing test information fed back for the corrected audio signal corresponding to the first frequency point.

10. The method according to claim 9, wherein said adjusting the first sound intensity of the corrected audio signal according to the hearing state comprises:

increasing the first sound intensity of the corrected audio signal by a first adjustment parameter when the hearing state indicates that the first sound intensity of the corrected audio signal does not belong to an audible range, or decreasing the first sound intensity of the corrected audio signal by a second adjustment parameter when the hearing state indicates that the first sound intensity of the corrected audio signal belongs to the audible range, the first adjustment parameter being greater than the second adjustment parameter.

11. The method according to claim 10, wherein the first adjustment parameter and the second adjustment parameter have values negatively correlated with a number of times the first sound intensity is adjusted.

12. The method according to claim 1, wherein the compensation parameter includes a compensation filter parameter, and said determining the compensation parameter according to the hearing test information comprises:

determining a compensation level matching the hearing test information according to the hearing test information; and calculating the compensation filter parameter corresponding to the hearing test information based on the compensation level, and the method further comprises:

configuring a target compensation filter based on the compensation filter parameter, the target compensation filter being configured to filter and compensate the target audio signal to be outputted.

13. The method according to claim 12, wherein said configuring the target compensation filter based on the compensation filter parameter comprises:

configuring, for M frequency points to be detected, M target compensation filters respectively according to a compensation filter parameter corresponding to each frequency point to be detected, where M is a positive integer greater than or equal to 1; and cascading the M target compensation filters.

14. The method according to claim 12, wherein the compensation filter parameter comprises a gain coefficient, and said calculating the compensation filter parameter corresponding to the hearing test information based on the compensation level comprises:

determining, for P frequency points to be detected, a gain coefficient corresponding to a compensation level corresponding to each frequency point to be detected according to the compensation level, where P is a positive integer greater than or equal to 1, and wherein said configuring the target compensation filter based on the compensation filter parameter comprises:

configuring a target compensation filter corresponding to a second frequency point according to a gain coefficient corresponding to the second frequency point, the target compensation filter being configured to perform gain compensation for a signal component corresponding to the second frequency point in the target audio signal to be outputted according to the gain coefficient corresponding to the second frequency point, the second frequency point being any one of the P frequency points to be detected.

15. The method according to claim 14, wherein said configuring the target compensation filter corresponding to the second frequency point according to the gain coefficient corresponding to the second frequency point comprises:

determining, when the gain coefficient corresponding to the second frequency point is greater than a gain threshold, an attenuation coefficient matching the gain coefficient, and configuring the target compensation filter corresponding to the second frequency point according to the gain coefficient corresponding to the second frequency point and the attenuation coefficient.

16. The method according to claim 12, further comprising, subsequent to calculating the compensation filter parameter corresponding to the hearing test information based on the compensation level:

determining a style adjustment parameter corresponding to a target audio style according to the target audio style, and adjusting the compensation filter parameter according to the style adjustment parameter, wherein said configuring the target compensation filter based on the compensation filter parameter comprises:

configuring the target compensation filter based on the adjusted compensation filter parameter.

17. An earphone, comprising a speaker, a memory and a processor, wherein the memory has a computer program stored thereon, and the computer program, when executed by the processor, causes the processor to implement:

performing system frequency response correction on an initial audio signal to obtain a corrected audio signal;

outputting the corrected audio signal via the speaker;

obtaining hearing test information fed back for the corrected audio signal; and determining a compensation parameter according to the hearing test information, the compensation parameter being used to compensate a target audio signal to be outputted;

wherein the earphone further comprises a feedback microphone, and the method further comprising, prior to performing the system frequency response correction on the initial audio signal to obtain the corrected audio signal:

outputting a test audio signal via the speaker;

detecting a received audio signal corresponding to the test audio signal via the feedback microphone; and calculating a system correction parameter according to the test audio signal and the received audio signal, and wherein said performing the system frequency response correction on the initial audio signal to obtain the corrected audio signal comprising:

performing the system frequency response correction on the initial audio signal according to the system correction parameter to obtain the corrected audio signal;

wherein the system correction parameter comprises a target equalizer parameter, and said calculating the system correction parameter according to the test audio signal and the received audio signal comprises:

performing Fourier transform (FT) on each of the test audio signal and the received audio signal;

comparing the Fourier transformed received audio signal with the Fourier transformed test audio signal to obtain a system frequency response; and calculating the target equalizer parameter according to the system frequency response, and said performing the system frequency response correction on the initial audio signal according to the system correction parameter to obtain the corrected audio signal comprises:

performing equalization correction on the initial audio signal using a target equalizer configured based on the target equalizer parameter, to obtain the corrected audio signal.

18. A non-transitory computer-readable storage medium, having a computer program stored thereon, wherein the computer program, when executed by a processor, implements:

performing system frequency response correction on an initial audio signal to obtain a corrected audio signal;

outputting the corrected audio signal via a speaker;

obtaining hearing test information fed back for the corrected audio signal; and determining a compensation parameter according to the hearing test information, the compensation parameter being used to compensate a target audio signal to be outputted;

wherein the earphone further comprises a feedback microphone, and the method further comprising, prior to performing the system frequency response correction on the initial audio signal to obtain the corrected audio signal:

outputting a test audio signal via the speaker;

detecting a received audio signal corresponding to the test audio signal via the feedback microphone; and calculating a system correction parameter according to the test audio signal and the received audio signal, and wherein said performing the system frequency response correction on the initial audio signal to obtain the corrected audio signal comprising:

performing the system frequency response correction on the initial audio signal according to the system correction parameter to obtain the corrected audio signal;

wherein the system correction parameter comprises a target equalizer parameter, and said calculating the system correction parameter according to the test audio signal and the received audio signal comprises:

performing Fourier transform (FT) on each of the test audio signal and the received audio signal;

comparing the Fourier transformed received audio signal with the Fourier transformed test audio signal to obtain a system frequency response; and calculating the target equalizer parameter according to the system frequency response, and said performing the system frequency response correction on the initial audio signal according to the system correction parameter to obtain the corrected audio signal comprises:

performing equalization correction on the initial audio signal using a target equalizer configured based on the target equalizer parameter, to obtain the corrected audio signal.

* * * * *